Nov. 20, 1962

J. C. TROTTER 3,065,036

HYDROSTATIC BEARING

Filed Dec. 9, 1960

INVENTOR.
JOHN C. TROTTER

BY

Beau, Brooks, Buckley & Beau.

Nov. 20, 1962
J. C. TROTTER
3,065,036
HYDROSTATIC BEARING
Filed Dec. 9, 1960
2 Sheets-Sheet 2
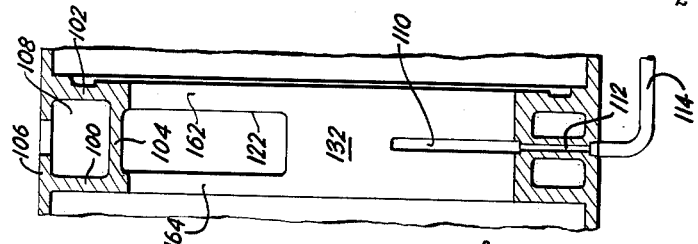
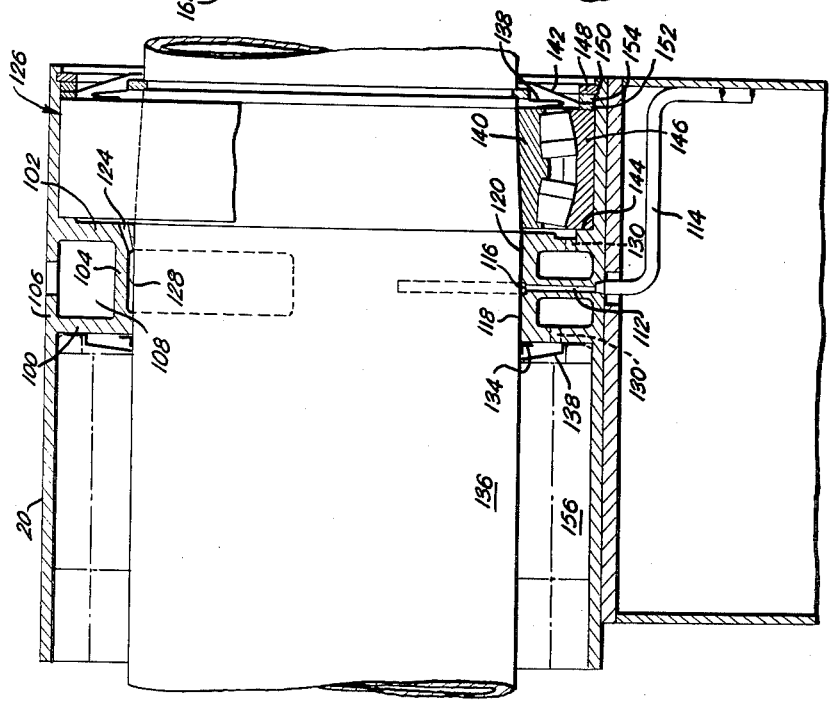
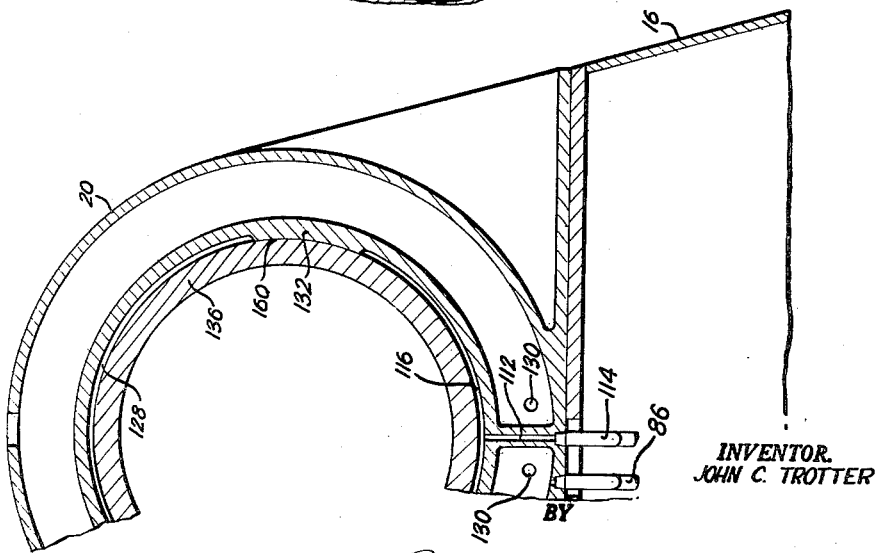
INVENTOR.
JOHN C. TROTTER
BY
Beau, Brooks, Buckley & Beau.

United States Patent Office 3,065,036
Patented Nov. 20, 1962

3,065,036
HYDROSTATIC BEARING
John C. Trotter, Williamsville, N.Y., assignor to
Bell Aerospace Corporation
Filed Dec. 9, 1960, Ser. No. 75,005
5 Claims. (Cl. 308—35)

This invention relates to anti-friction bearing systems and pertains, more particularly, to a composite system in which a hydrostatic bearing is cooperatively related to a more conventional and economical type of anti-friction bearing in such fashion that the system approaches the desirable anti-friction characteristics of the hydrostatic bearing while approaching the economy of the conventional bearing. By the term "conventional bearing" is meant bearings such as those in which two relatively slidable surfaces are separated by a film of oil, as in a bushing, ball bearings and roller bearings, the latter two types being preferable.

The use of hydrostatic bearings and their attendant advantage of producing extremely low friction characteristics are well known. However, in many applications, the cost of hydrostatic bearing equipment is not warranted and for this reason conventional bearings, particularly roller or ball bearings, are sometimes used in cases where the use of a hydrostatic bearing would otherwise seem to be indicated. Under such conditions, the compromise may require the use of much higher rated power equipment than would be required were the hydrostatic type of bearing or bearings to be utilized. It is therefore of primary concern in connection with the present invention to provide a bearing system which approaches the low cost of a conventional bearing system and which at the same time approaches the anti-friction characteristics of a hydrostatic bearing system.

Essentially, this main objective of the present invention is accomplished by combining a hydrostatic bearing or bearings with a conventional bearing or bearings in what might be termed "parallel" relationship. That is, a hydrostatic bearing and a conventional bearing combination is employed in which both bearings are physically located so as to support some common load component but in which the hydrostatic bearing is capable of and intended to contribute all or at least a major portiion of the support for the stated load component, thus relieving the conventional bearing of this duty, at least to a great extent.

It is a further object of this invention to provide an improved bearing system in which a conventional bearing, preferably a roller or ball bearing, is utilized as the principal means for positioning the article supported whereas a simplified hydrostatic bearing is utilized for the purpose of supporting substantially all or at least a major portion of the static load to thus relieve the conventional bearing of this duty, thereby simplifying the requirement of the hydrostatic bearing and permitting a marked decrease in the friction characteristics of the system.

Another object of this invention resides in the combination of a hydrostatic type of bearing and a conventional bearing in which the two bearings act cooperatively and cojointly for supporting the object to be rotated in such fashion as to impose a minimum complexity on the hydrostatic bearing while at the same time imposing a minimum load carrying requirement on the conventional bearing, the net result being to produce a system approaching a conventional bearing system in cost while at the same time approaching the frictional characteristics of a hydrostatic bearing.

In the drawings:

FIGURE 5 is an enlarged partial section taken generally along the plane of section line 5—5 in FIGURE 1 showing the hydrostatic bearing to be utilized in the trunnion in the mechanism shown in FIGURES 1 and 2;

FIGURE 6 is a longitudinal section taken through one of the trunnions in FIGURES 1 and 2 and showing the combined system utilized therein in accordance with the present invention; and FIGURE 7 is a longitudinal sectional view showing one-half of the hydrostatic bearing in elevation.

Figure 1:
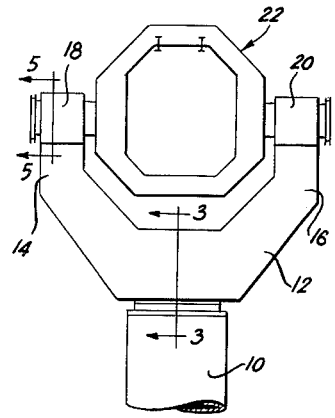
FIGURE 1 is a front elevational view of the support assembly for such mechanisms as large antennas, optical telescopes and the like for illustrating possible uses for the present invention.
Figure 2:
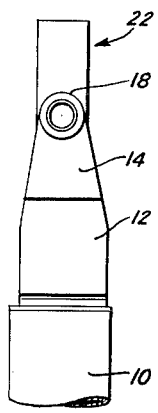
FIGURE 2 is a side elevational view of the assembly shown in FIGURE 1.

With reference now more particularly to FIGURES 1 and 2 the assembly shown therein illustrates one type of mechanism with which the present invention may be utilized. Such mechanism includes a pedestal 10 rotatably supporting a yoke 12 having trunnion arms 14 and 16 terminating in trunnion bosses 18 and 20. The object 22 which is supported by the trunnions may consist of a part of a large antenna system, an optical telescope or a similar object. As may be readily appreciated, rotation of the yoke 12 will determine the azimuth bearing of the object 22 whereas rotation of the object within the trunnions will determine the elevational bearing thereof. Such objects as are contemplated for support in accordance with the present invention are frequently relatively heavy. For example, a specific application of the present system contemplates a static weight load of 128,044 pounds on the two trunnions and a load of the yoke upon the pedestal of 213,000 lbs. In addition to this there will be further loading imposed upon both the trunnions and the pedestal due to torque reactions of those devices or mechanisms used to effect the rotation of the yoke and object. Obviously a fully hydrostatic system could be designed for the mechanism but in many instances thereof the cost may be prohibitive since a hydrostatic system will of necessity be rather complex in construction.

Figure 3:
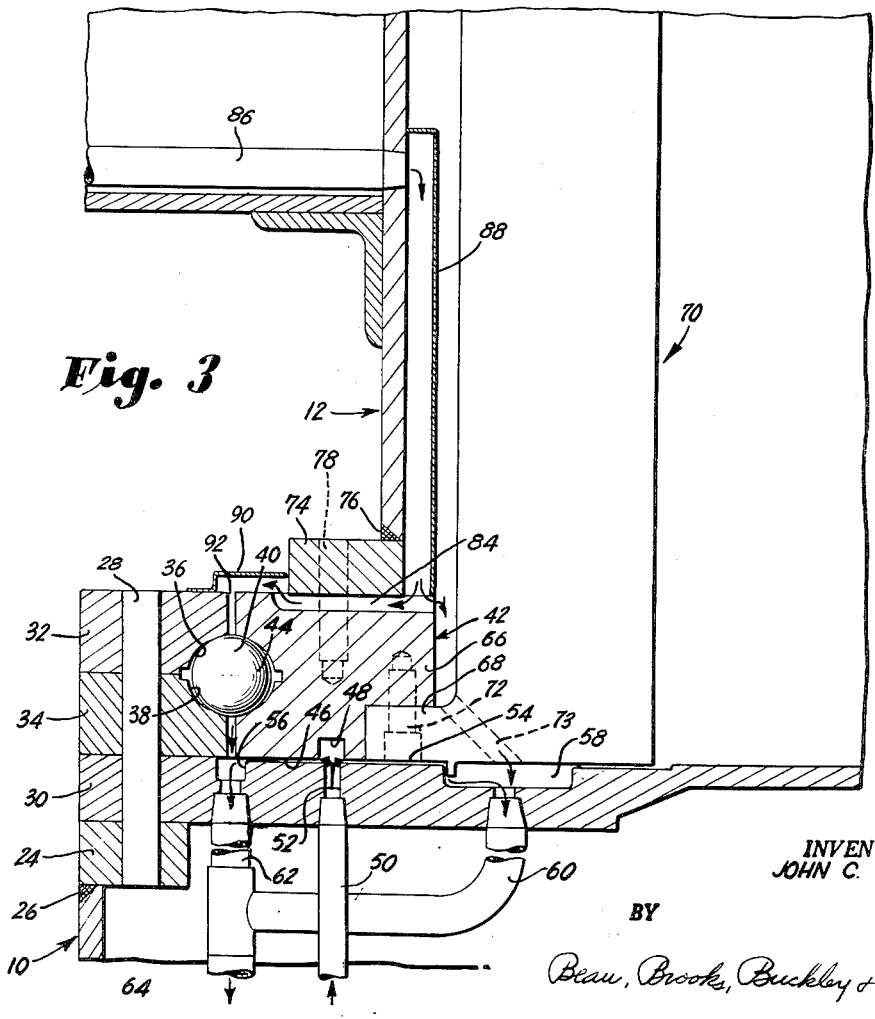
FIGURE 3 is an enlarged partial section taken through the pedestal of the support mechanism illustrated in FIGURES 1 and 2 and being taken along the section line indicated by the section line 3—3 in FIGURE 2.

Therefore, a system in accordance with FIGURE 3 is contemplated for use in connection with the yoke and the pedestal. In FIGURE 3, the pedestal 10 will be seen to include an upper ring member 24 welded as at 26 to an upper end of the pedestal column and which is suitably apertured at spaced circumferential points therealong to receive anchoring pin members 28 which serve to fixedly position an annular plate 30 upon the ring 24. The pins 28 also project through alined apertures in the upper and lower halves 32 and 34 of an outer race assembly presenting grooves 36 and 38 to receive the balls 40 substantially as is shown. An inner race member 42 is associated with the outer race halves 32 and 34 and the ball 40, presenting the grooves 44 receiving the balls 40 as is shown. The inner race 42 is of special construction and has a bottom surface 46 provided with a circumferentially extending groove 48 which serves as an oil galley, being fed from the high pressure line 50 connected to the plate 30 and connecting with the groove 48 through the passage 52. The upper surface portion 54 of the plate 30 which opposes the undersurface 46 of inner race 42 cooperates with such undersurface 46 to present a hydrostatic bearing by reason of the separation of these surfaces produced by the film of oil escaping from the groove 48 laterally inwardly and outwardly between the two surfaces. The table or plate 30 is provided with a pair of circumferentially extending concentric sumps 56 and 58 which serve to collect the escaping hydrostatic fluid and each is provided with return line connections as indicated by reference characters 60 and 62 to return the hydrostatic fluid by means of conduit 64 to the high pressure pump system associated therewith but not shown specifically in the drawings.

It will be readily appreciated that the system shown in FIGURE 3 incorporates the combination of a conventional bearing, in this specific instance a ball bearing, and a hydrostatic bearing in which the hydrostatic bearing is of relatively simple construction and is utilized only to relieve the ball bearing of substantially all or at least a major portion of the static load which would otherwise be imposed thereon. Thus, the frictional characteristics of the system will be much lower than were the ball bearing or its equivalent to be utilized alone while, at the same time, the hydrostatic bearing is of such simple construction that its cost is reduced to a minimum.

The inner race 42 may be provided with an inner lip 66 which will receive the ear 68 of a torque motor indicated generally by the reference character 70, the details of which form no part of the present invention. The torque motor, because of the frictional characteristics of the system described, may be of much less power requirement than would be required in a conventional bearing system alone and hence the cost of the hydrostatic portion of the system is at least partially if not wholly offset. The torque motor 70 is connected directly to the inner race 42 as by machine screw elements 72 and may be provided with a passage 73 acting as a return line to sump 58, as explained hereinafter.

Figure 4:
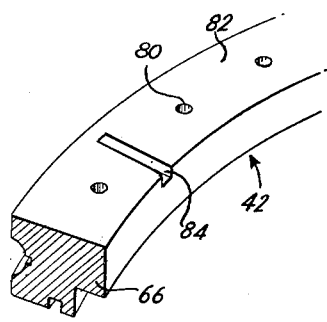
FIGURE 4 is a partial perspective view of the inner race of the system shown in FIGURE 3.

The yoke 12 is provided with a ring 74 welded as at 76 or otherwise secured to the lower end thereof which is provided with a series of circumferentially spaced openings to receive a series of pins 78 received also in alined apertures 80 in the inner race for the purpose of connecting the yoke assembly 12 directly to the inner race. The upper surface 82 of the inner race is provided with a pair of diametrically opposed notches 84, one of which is shown in FIGURE 4, originating short of the outer periphery of the inner race and extending all the way to the inner side thereof. These notches serve as return passages for hydrostatic fluid returning from the yoke bearing system through the return lines, one of which is illustrated by the line 86 shown in FIGURE 3 which line connects with the downspout 88. The upper portion 32 of the outer race of the conventional bearing is provided with an annular deflector shield 90 which prevents oil loss at this point and permits some of the lead oil to pass down between the inner and outer races in the space indicated by reference character 92 to effect lubrication of this bearing by means of the return of the hydrostatic system.

Referring more particularly to FIGURES 5–7, the system as shown therein may incorporate a hydrostatic bearing built integral with the trunnion parts 20 or 18 as the case may be. This hydrostatic bearing assembly includes a radially inwardly projecting annulus or saddle having opposite side walls 100 and 102 and an inner wall 104 defining, with the corresponding outer wall portion 106 of the trunnion, an annular chamber 108 for returning the hydrostatic fluid. As shown most clearly in FIGURE 7 the major extent of the lower portion of the saddle is provided with a centrally located narrow groove 110 connecting with a vertical passage 112 to which is in turn connected the high pressure hydrostatic fluid line 114 so that this groove 110 forms an oil galley 116, see FIGURES 5 and 6, for distributing the hydrostatic fluid throughout the lower half of the bearing wherefrom it is bled off laterally to either side, within the clearance spaces 118 and 120 at the interface of the shaft and saddle surfaces to spill to either side of the hydrostatic bearing. The major extent of the upper half of the hydrostatic bearing is provided with a relatively wide groove 122 which acts as a relief chamber having at least one relief passage 124 therein leading laterally therefrom towards the roller bearing assembly indicated generally by the reference character 126. This groove accomplishes two purposes. First it vents the relief chamber 128 formed by the groove 122 and it also serves to provide a source of lubrication for the roller bearing 126.

The side walls 100 and 102 are provided with relief passages 130 at the bottom thereof which are adapted to collect the return oil and lead it into the chamber 108 for ultimate disposition to one of the return lines 86, see particularly FIGURE 5.

The portions 132 of the inner surface of the hydrostatic bearing which are not provided with the groove 110 or the groove 122 act as dams and prevent the chamber 128 from being pressurized, forcing the hydrostatic fluid to bleed out through the clearance spaces 118 and 120. The hydrostatic fluid bleeding out through the clearance space 118 is deflected by an annular baffle 134 fixed to the shaft 136 and a further annular baffle 138 is carried by the casing or as shown it may be carried by the side wall 100 of the hydrostatic bearing. The opposite side of the hydrostatic bearing is left free to communicate with the roller bearing 126 although provision is made through the medium of an annular baffle 138 carried by the shaft 136 and bearing against the inner race 140 of the roller bearing and through the medium of an annular baffle or deflector 142 carried by the casing to prevent the hydrostatic fluid from leaking out past the roller bearing 126. In the particular construction shown the interior of the case is stepped as at 144 to provide a seat against which the outer race 146 engages and a snap ring 148 received in a suitable groove 150 of the trunnion casing sandwiches the deflector 142 between a pair of spacer rings 152 and 154 which in turn act to axially position the outer race 146.

In operation, it will be appreciated that the high pressure line 114 serves to pressurize the galley 116 and that the film of fluid escaping in the clearance spaces 116 and 118 relieves the roller bearing 126 of substantially all or at least a major portio n of the static load imposed to the structure through the trunnion shafts 136 leaving the bearing 126 to act only as an axial positioning structure and to take up inertia loads and the like which may be occasioned by operation of the torque motor 156 which is utilized to drive the trunnion shafts 136. It will be appreciated that there is sufficient clearance provided in the areas 160 between each shaft 136 and the dams 132 preventing metallic contact and that there is also clearance between the surfaces 162 and 164, see FIGURE 6, above the dams 132 to prevent metallic contact when the shafts are supported by the hydrostatic bearing. In other words, the bearing effect produced by the hydrostatic portion of the system acts only on the lower region of the shafts 136 and is utilized solely for the purpose of supporting the static loading of the system.

It will be understood that in both forms of the invention shown, the hydrostatic bearing is preferably so constructed so that should complete failure of the hydrostatic system occur, due to any means whatsoever, the oil film-forming surfaces of the bearing will not actually come into contact. That is to say, the conventional bearing in the system will completely take over the load carrying duty normally performed by the hydrostatic bearing before such contact occurs. In other words, in FIGURE 3, it is preferred that the surfaces 46 and 54 are never in actual contact even when the hydrostatic fluid pressure is non-existent. Likewise, the hydrostatic bearing surface in FIGURE 6 which forms the clearance spaces 118 and 120 preferably is never contacted with the shaft 136 nor is any portion of this hydrostatic bearing in contact with the shaft at any time. As stated before, this prevents damage to the hydrostatic bearing surfaces should this part of the bearing system fail, as for example, due to a hydraulic or electrical failure in the hydrostatic system.

I claim:

1. An antifriction bearing system comprising a base member, a rotatable member mounted on said base for rotation relative thereto about a predetermined axis, a metallic-contact bearing between said members constraining said rotatable member for movement about said axis, and a hydrostatic bearing between said members for supporting at least a major portion of the weight of the rotatable member and so to relieve the metallic-contact bearing of friction-producing loads thereon due to the weight of the rotatable member, the first bearing comprising concentrically disposed inner and outer races, one of which is rigid with said base member and the other of which is rigid with said rotatable member, and ball means interposed between said races; said other of the races having an annular face disposed in overlying, vertically spaced and opposed relation to an annular surface portion of said base member; and means for feeding hydrostatic fluid to the interface between such opposed surfaces to constitute said hydrostatic bearing.

2. In a load sustaining system, a base and a member to be rotatably mounted on said base, first bearing means locating said member relative to said base and including inner and outer race portions and a plurality of antifriction elements interposed between said race portions to roll thereon, hydrostatic bearing means interposed between said base and said member and acting to relieve said first bearing means of substantially all of the weight load of said member, said member being in the form of a weight-supporting, horizontal shaft, said hydrostatic bearing means including a saddle surrounding said shaft, said saddle having a groove in its lower portion and a trough in its upper portion with the ends of said groove and trough being disposed in spaced relation to present dams therebetween, and means for feeding hydrostatic fluid under pressure to said groove.

3. An antifriction bearing system comprising a supporting base, an object mounted on said base for rotation relative thereto about a predetermined axis, a metallic-contact bearing between said object and said base constraining said object for rotational movement about said axis, and a hydrostatic bearing between said object and said base for supporting at least a major portion of the weight of the object and so to relieve the metallic-contact bearing of friction-producing loads thereon due to the weight of the object, said base being in the form of a pedestal and said object being in the form of a yoke supported on the pedestal, the first bearing having an outer race fixed to the pedestal and an inner race fixed to the yoke with a plurality of balls interposed between said races, said base having a surface portion opposed to the undersurface of said inner race, and means for feeding hydrostatic fluid to the interface between said opposed surfaces to constitute said hydrostatic bearing.

4. An antifriction bearing system comprising a supporting base, an object mounted on said base for rotation relative thereto about a predetermined axis, a metallic-contact bearing between said object and said base constraining said object for rotational movement about said axis, and a hydrostatic bearing between said object and said base for supporting at least a major portion of the weight of the object and so to relieve the metallic-contact bearing of friction-producing loads thereon due to the weight of the object, said object being in the form of a horizontal, weight-supporting shaft, the first bearing having an inner race fixed to the shaft, an outer race carried by the base, and a plurality of rollers interposed between said races, said hydrostatic bearing being in the form of a saddle rigid with said base and surrounding said shaft, said saddle having a lower surface closely opposed to and conforming to the surface of said shaft and having an upper surface relatively widely spaced from the shaft, and means for feeding hydrostatic fluid under pressure to the interface between said saddle lower surface and said shaft.

5. In a support for large antenna and the like, a pedestal, a yoke adapted to be rotatably supported by said pedestal, and a trunnion adapted to be rotatably supported by said yoke, a ball bearing having its outer race fixed to said pedestal and its inner race fixed to said yoke, said inner race and said pedestal having opposed horizontal surfaces, means for feeding hydrostatic fluid under pressure to the interface between said opposed horizontal surfaces to relieve the ball bearing of a major portion of vertical loads imposed thereon, said yoke having a pair of horizontally spaced arms supporting said trunnion, a roller bearing carried by each arm locating said trunnion, and a hydrostatic bearing carried by each arm for relieving the respective ball bearings of at least a major portion of the vertical loads thereon.

References Cited in the file of this patent
UNITED STATES PATENTS

| | | |
|---|---|---|
| 1,441,614 | Wadsworth | Jan. 9, 1923 |
| 1,946,652 | Wallgren | Feb. 13, 1934 |
| 2,182,012 | Bunnell | Dec. 5, 1939 |
| 2,423,973 | Halford | July 15, 1947 |
| 2,695,198 | Brugger | Nov. 23, 1954 |